United States Patent
Kotni et al.

(10) Patent No.: US 12,008,011 B2
(45) Date of Patent: Jun. 11, 2024

(54) COMPUTING RESOURCE MIGRATION ACROSS CLOUD ENVIRONMENTS

(71) Applicant: Rubrik, Inc., Palo Alto, CA (US)

(72) Inventors: Jaya Jyothiswaroop Kotni, Bengaluru (IN); Shivanshu Agrawal, Seattle, WA (US); Kritagya Dabi, Indore (IN); Dhananjay Mantri, Palo Alto, CA (US); Ankit Kumar, Bengaluru (IN); Ujjwal Sahana, Bengaluru (IN); Rimple Malik, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 120 days.

(21) Appl. No.: 17/724,812

(22) Filed: Apr. 20, 2022

(65) Prior Publication Data

US 2023/0342373 A1    Oct. 26, 2023

(51) Int. Cl.
*G06F 16/25*    (2019.01)
(52) U.S. Cl.
CPC ........ *G06F 16/254* (2019.01); *G06F 2201/84* (2013.01)
(58) Field of Classification Search
CPC .................. G06F 16/254; G06F 2201/84
See application file for complete search history.

(56) References Cited

U.S. PATENT DOCUMENTS

| | | | | |
|---|---|---|---|---|
| 10,901,768 | B1* | 1/2021 | Mandadi | H04L 41/0897 |
| 11,366,682 | B1* | 6/2022 | Krasilnikov | G06F 9/45558 |
| 2017/0344433 | A1* | 11/2017 | Bae | G06F 11/1456 |
| 2022/0327007 | A1* | 10/2022 | Adogla | G06F 9/5055 |

* cited by examiner

*Primary Examiner* — Grace Park
(74) *Attorney, Agent, or Firm* — Holland & Hart LLP

(57) ABSTRACT

A method for migrating a computing resource across cloud environments is described. According to the method, a data management system may interface with a first cloud environment and a second cloud environment. The data management system may receive a request to migrate a first computing resource stored in the first cloud environment to the second cloud environment. The data management system may generate, based on the request, a first compute job in the first cloud environment to cause the first cloud environment to extract data from a backup of the first computing resource and transfer the data to the second cloud environment. The data management system may instruct the second cloud environment to generate a second computing resource. The data management system may generate a second compute job in the second cloud environment to cause the second cloud environment to load the extracted data into the second computing resource.

20 Claims, 11 Drawing Sheets

COMPUTING RESOURCE MIGRATION ACROSS CLOUD ENVIRONMENTS

FIELD OF TECHNOLOGY

The present disclosure relates generally to database systems and data processing, and more specifically to computing resource migration across cloud environments.

BACKGROUND

A cloud environment may be employed by one or more users to store, manage, and process data using a shared network of remote servers. A data management system may be a computing system employed to manage, process, backup, and restore data using a network of computing devices. For example, a data management system may be employed by a user to manage backup and restoration of data and other computing resources of the user that are stored within a cloud environment.

A user may store data and computing resources within a cloud environment. In some systems, the user may not be able to efficiently transfer the resources to other cloud environments associated with different cloud services and platforms due to, for example, differences in formats or other incompatibilities associated with different cloud service providers, which may increase costs and impose some security threats.

DETAILED DESCRIPTION

Figure 1:
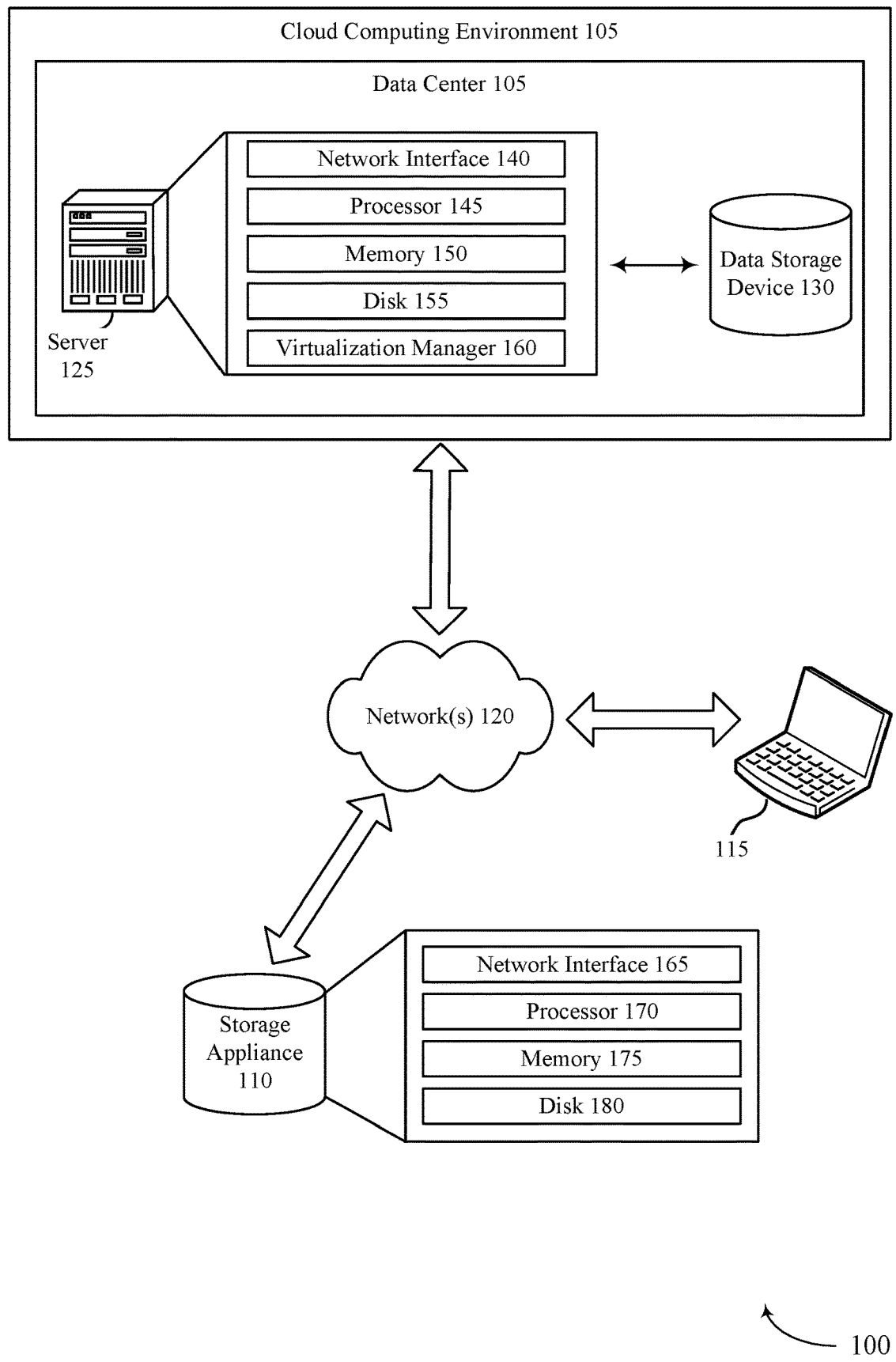
FIG. 1 illustrates an example of a computing environment that supports computing resource migration across cloud environments in accordance with aspects of the present disclosure.

Cloud computing environments may provide cloud services to multiple customers, which may be referred to as tenants, users, clients, or enterprises. A cloud computing environment (e.g., Amazon Web Services, Azure, Google Cloud Platform, or other cloud computing environments) may be referred to as a cloud environment, a cloud service, or a cloud, and a company that provides a cloud environment may be referred to as a cloud provider or cloud vendor. Some cloud computing environments may not support efficient transfer of data or other resources between cloud computing environments. For instance, a customer that uses a first cloud computing environment associated with a first cloud vendor may not be able to efficiently or reliably transfer some or all data or other computing resources to a different cloud computing environment associated with a second cloud vendor, which may be referred to as vendor lock-in. Vendor lock-in may increase costs for the customer, may introduce security risks associated with most or all of the customer's enterprise being stored in a same cloud computing environment, or both.

Techniques described herein provide for a data management system to support migration of resources between two or more cloud computing environments. The data management system may be operable to connect with and manage computing resources stored within one or more cloud environments. For example, the data management system may instruct a cloud computing environment to generate and store a snapshot of a computing resource for a client. The data management system may be compatible with multiple different types of cloud platforms or protocols. As described herein, the data management system may utilize resources, software, and transient computing instances within the cloud computing environments to transfer computing resources between cloud computing environments based on requests by the customer (e.g., cloud-native data backup and migration).

To support such migration, the data management system may be configured to interact on behalf of the customer with both a first cloud computing environment (e.g., a source cloud computing environment), a second cloud computing environment (e.g., a target cloud computing environment), and/or one or more other cloud computing environments. The customer may provide grants of permission to the data management system (e.g., via a user interface) to permit the data management system to access the customer's resources stored within the two or more different cloud computing environments. The different cloud environments may use one or more different formats for data storage, computing resources, or other aspects thereof. The different cloud environment may be provided by different cloud vendors, in at least some cases. The customer may select a computing resource to migrate from the first cloud computing environment to the second cloud computing environment. In response to the customer's request, the data management system may instruct the first cloud computing environment to generate and store a backup (e.g., a first snapshot) of the computing resource. In some aspects, the first cloud computing environment may generate and store a snapshot or a full image of the computing resource within a threshold time of a time at which the request is received from the customer. In such cases, the data management system may instruct the first cloud computing environment to use the previously generated snapshot.

The data management system may generate a first compute job within the first cloud computing environment based on receiving the request. The first cloud computing environment may execute the first compute job, which may include processing the backup of the computing resource to generate a full backup of the resource, extracting data from the backup, and generating a second version of the backup that includes the extracted data and has a second format that is supported by the second cloud environment. The first cloud computing environment may transfer, as part of the first compute job, the data having the second format to the second cloud computing environment. The data management system may instruct the second cloud computing environment to create a new computing resource therein.

The data management system may subsequently generate a second compute job within the second cloud computing environment. The second cloud computing environment may execute the second compute job, which may include processing the data transferred to the second cloud computing environment and incorporating, or ingesting, the data into the new resource created on the second cloud computing environment. The first and second compute jobs may each represent an example of a transient computing instance within the respective cloud environment. The data management system may be operable to generate the transient computing instances to perform corresponding data migration operations within the cloud environments. The compute jobs may thus be generated and/or managed by the data management system and may be executed by the cloud computing environments.

The data management system described herein may thereby provide for a customer to instruct first and second cloud computing environments to perform a cloud-native transfer of a computing resource between the cloud computing environments. By supporting migration of resources between two or more cloud computing environments, the data management system described herein may provide customers with an improved ability to efficiently switch between cloud vendors and shift which resources are stored on and serviced by each cloud vendor over time. The computing resources may be migrated between cloud computing environments to respond to vulnerabilities on a certain cloud computing environment, to adjust for changes in costs associated with different vendors, or both, which may improve security and reduce costs associated with data storage and management. Additionally or alternatively, the described techniques may provide for enhanced adoption of public cloud services.

Aspects of the disclosure are initially described in the context of an environment supporting an on-demand database service. Aspects of the disclosure are further described with reference to a cloud computing architecture of a system that supports computing resource migration across cloud environments and a process flow that describes methods for computing resource migration across cloud environments. Aspects of the disclosure are further illustrated by and described with reference to apparatus diagrams, system diagrams, and flowcharts that relate to computing resource migration across cloud environments.

FIG. 1 an example of a computing environment 100 for cloud computing that supports computing resource migration across cloud environments in accordance with aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The computing environment 100 may include a cloud computing environment 185 for one or more computing devices. Cloud computing may refer to Internet-based computing, wherein shared resources, software, and/or information may be provided to one or more computing devices on-demand via the Internet. The computing environment 100 may comprise a cloud computing environment 185 providing Software-as-a-Service (SaaS) or Infrastructure-as-a-Service (IaaS) services. SaaS may refer to a software distribution model in which applications are hosted by a service provider and made available to end users over the Internet. In one example, the computing environment 100 may include a virtualized infrastructure that provides software, data processing, and/or data storage services to end users accessing the services via the cloud computing environment 185. In one example, the cloud computing environment 185 may provide cloud-based work productivity or business-related applications to a computing device, such as computing device 115. In some examples, the cloud computing environment 185 may include a collection of one or more data centers 105. For example, applications and files for one or more clients that use the cloud computing environment 185 may be stored in one or more data centers 105. The example illustrated in FIG. 1 shows one cloud computing environment 185 and one data center 105, but it is to be understood that there may be any quantity of different cloud computing environments 185 and data centers 105. For example, the computing environment 100 may support cloud services provided by any quantity of different cloud vendors. The cloud computing environments 185 may each be associated with or include any quantity of servers 125 and data storage devices 130.

In some examples, the computing environment 100, the cloud computing environment 185, or both may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

The computing device 115 may be a personal computing device, such as a stationary device (e.g., a desktop computer or access point) or a mobile device (e.g., a cellular phone, laptop, table, personal digital assistant). The computing device 115 may be a commercial computing device, such as a server or collection of servers. The computing device may be a virtual device, e.g., a virtual machine.

The data center 105 may include one or more servers, such as server 125, and one or more storage devices, such as storage device 130, that are in communication with the one or more servers.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients. In some examples, the server 125 may be used to create and manage one or more virtual machines associated with a virtualized infrastructure. The one or more virtual machines may run various applications, such as a database application or a web server. The server 125 may include a network interface 140, processor 145, memory 150, disk 155, and virtualization manager 160 all in communication with each other.

Network interface 140 may enable server 125 to connect to one or more networks 120. Network interface 140 may include a wireless network interface and/or a wired network interface. Processor 145 may enable server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., RAM, SRAM, DRAM, ROM, EEPROM, Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as a storage appliance within data center 105 or storage appliance 110. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance within data center 105 or storage appliance 110 of FIG. 1, described further below) in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

In some examples, the data center 105 includes a storage appliance (e.g., the storage appliance 110) that includes a data management system for backing up virtual machines or files within a virtualized infrastructure. A storage appliance within data center may be configured similar to storage appliance 110. In some examples, a storage appliance in data center is an extension of storage appliance 110. For example, a storage appliance in data center may be an agent for storage appliance 110, where the agent may be implemented as software (e.g., installed at server 125 or at a central server) or as hardware in data center 105. When implemented as hardware, the server 125 and storage appliance may be in communication with each other via a networking fabric connecting servers and data storage units within the data center 105 to each other.

The one or more networks 120 may allow computing devices or storage devices to connect to and communicate with other computing devices or other storage devices in computing environment 100. The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

The storage appliance 110 may comprise a cloud-based data management system for backing up virtual machines and/or files within a virtualized infrastructure, such as virtual machines running on server 125 or files stored on server 125. The storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines. The storage appliance may include a network interface 165, processor 170, memory 175, and disk 180, which may be configured similarly as the corresponding components of server 125.

In some examples, the storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 110 may restore a point-in-time version of a virtual machine or restore point-in-time versions of one or more files located on the virtual machine and transmit the restored data to the server 125. In response to a mount command from the server 125, the storage appliance 110 may allow a point-in-time version of a virtual machine to be mounted and allow the server 125 to read and/or modify data associated with the point-in-time version of the virtual machine. To improve storage density, the storage appliance 110 may deduplicate and compress data associated with different versions of a virtual machine and/or deduplicate and compress data associated with different virtual machines. To improve system performance, the storage appliance 110 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

In some examples, storage appliance 110 is located within data center 105. In some examples, a storage appliance within data center 105 may similarly perform (e.g., instead of or in combination with storage appliance 110) the operations and functions described with reference to storage appliance 110.

Techniques described herein may support migration of computing resources between two or more different cloud computing environments 185 that execute different cloud protocols. In some aspects, the computing environment 100 may provide two or more cloud computing environments 185 for a computing device. For example, computing resources for a first user may be stored within two or more different cloud computing environments 185. Such distribution of enterprise data, applications, or other computing resources may provide for enhanced security, improved reliability, reduced costs, or any combination thereof. A data management system may be implemented by or executed on a storage appliance 110, and may manage data backup and restoration within each cloud computing environment 185. The user may grant permission for the data management system to access the user's data within each cloud computing environment 185.

As described herein, a user may request the data management system to transfer a first computing resource from a first cloud computing environment 185 to a second cloud computing environment 185. To perform the resource migration, the data management system may instruct the first cloud computing environment 185 to obtain a snapshot of the first computing resource, and the data management system may generate a compute job in the first cloud computing environment 185 to extract data from the snapshot and transfer the data to the second cloud environment 185. The data management system may instruct the second cloud computing environment 185 to generate a second computing resource. The data management system may subsequently generate a second compute job in the second cloud computing environment 185 to process the transferred data and ingest or load the data into the second computing resource. The described techniques may thereby provide for a user to request a cloud-native transfer of a computing resource between two different cloud computing environments 185.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
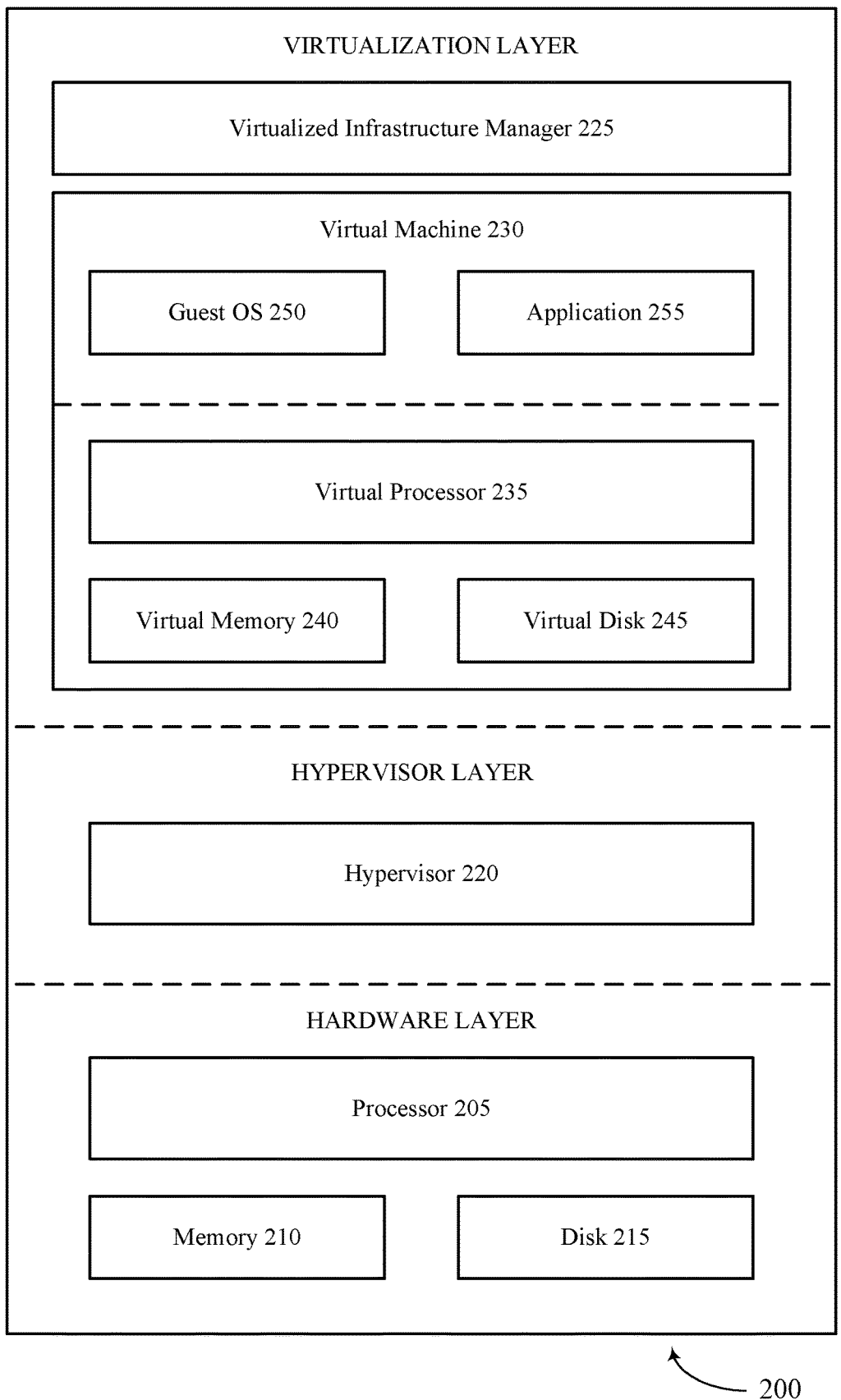
FIG. 2 illustrates an example of a server that supports computing resource migration across cloud environments in accordance with aspects of the present disclosure.

FIG. 2 illustrates an example of a server 200 that supports computing resource migration across cloud environments in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

A data management system running on a storage appliance, such as storage appliance 110 in FIG. 1 or storage appliance 135 in FIG. 1, may manage backup and restoration of enterprise data associated with the server 200, one or more other servers 200, or both. For example, the server 200 may be operable to host or manage a database for storing data, such as a data storage device 130 in FIG. 1. In some aspects, the server 200 may be associated with a cloud computing environment, such as a cloud computing environment 185 described with reference to FIG. 1, and may support a first cloud platform. One or more other servers 200 may similarly manage and store enterprise data, and may be associated with the same or a different cloud platform. A data management system implemented on a storage appliance may be operable to manage data stored on, executed by, or hosted by two or more other servers 200. For example, a user may grant permission for the data management system to access the user's enterprise data within multiple servers 200, where each server 200 may correspond to a respective cloud environment.

As described, herein, a user may request that a first computing resource is transferred from a first cloud environment to a second cloud environment. To perform the resource migration, the data management system may instruct the first cloud environment (e.g., a first server 200) to obtain a snapshot of the first computing resource, which may include data, a virtual machine 230, a virtual disk 245, an application executing on a virtual machine 230, or some other computing resource within the server 200. The data management system may generate a compute job in the first cloud environment to extract data from the snapshot and transfer the data to the second cloud environment (e.g., a second server 200). The data management system may instruct the second cloud environment to generate a second computing resource. The data management system may subsequently generate a second compute job in the second cloud environment to process the transferred data and ingest or load the data into the second computing resource. The described techniques may thereby provide for a user to request a cloud-native transfer of a computing resource between two different cloud environments.

Figure 3:
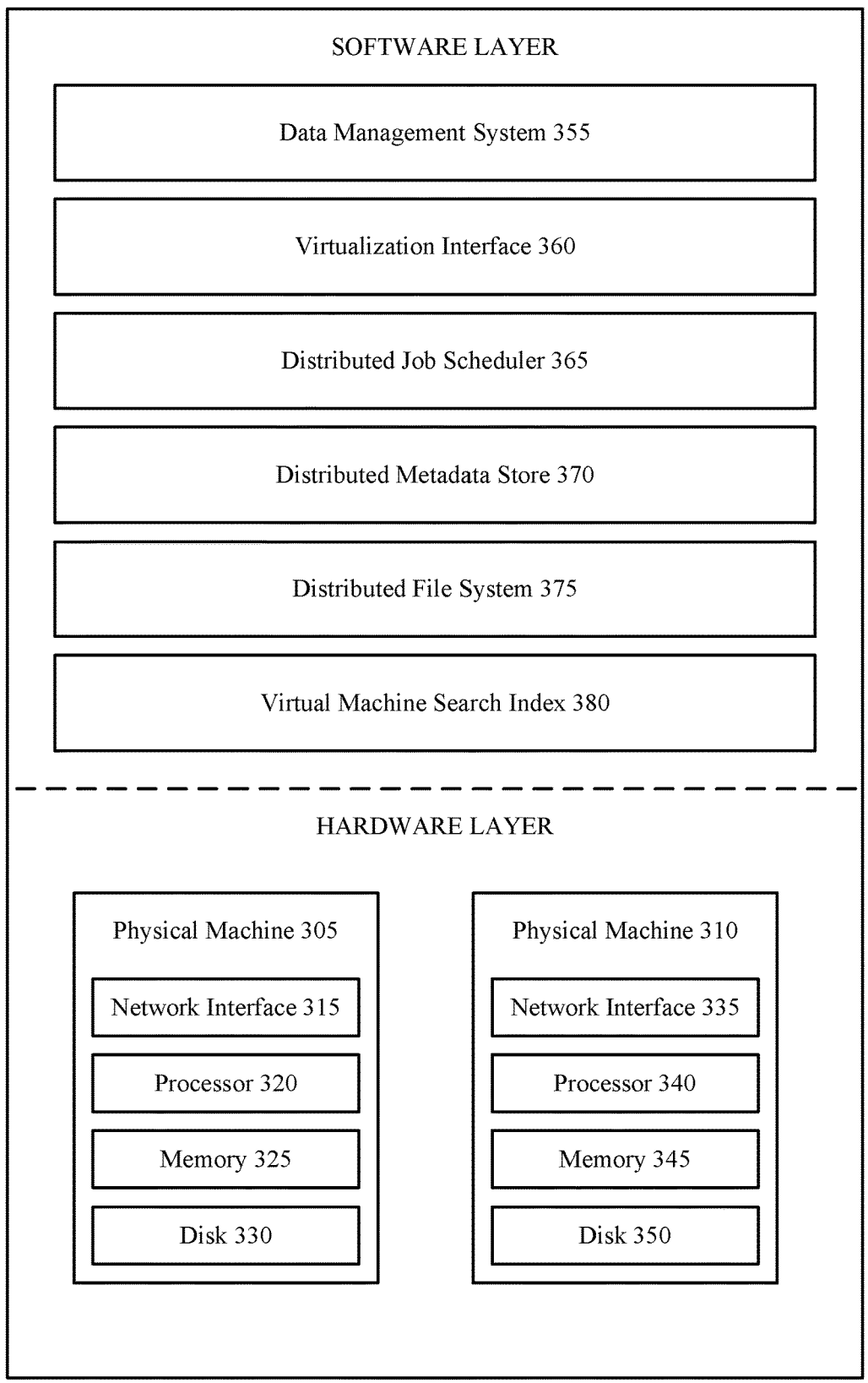
FIG. 3 illustrates an example of a storage appliance that supports computing resource migration across cloud environments in accordance with aspects of the present disclosure.

FIG. 3 illustrates an example of a storage appliance 300 that supports computing resource migration across cloud environments in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g.,/snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300 or server 200 may support migration of computing resources between two or more different cloud environments that execute different cloud protocols. In some aspects, the data management system 355 running on the storage appliance 300 may manage data stored across one or more servers 200 and corresponding cloud environments, as described with reference to FIGS. 1 and 2. For example, computing resources for a first user may be stored within two or more different cloud computing environments, which may represent examples of the cloud computing environment 185 described with reference to FIG. 1. Such distribution of enterprise data, applications, or other computing resources may provide for enhanced security, improved reliability, reduced costs, or any combination thereof. The user may grant permission for the data management system 355 to access the user's data within each cloud environment. The user may request that a first computing resource is transferred from a first cloud environment to a second cloud environment.

To perform the resource migration, the data management system 355 may instruct the first cloud environment to obtain a snapshot of the first computing resource. The data management system 355 may generate a compute job in the first cloud environment to extract data from the snapshot and transfer the data to the second cloud environment. The data management system 355 may instruct the second cloud environment to generate a second computing resource. The data management system 355 may subsequently generate a second compute job in the second cloud environment to process the transferred data and ingest or load the data into the second computing resource. The described techniques may thereby provide for a user to request a cloud-native transfer of a computing resource between two different cloud environments.

Figure 4:
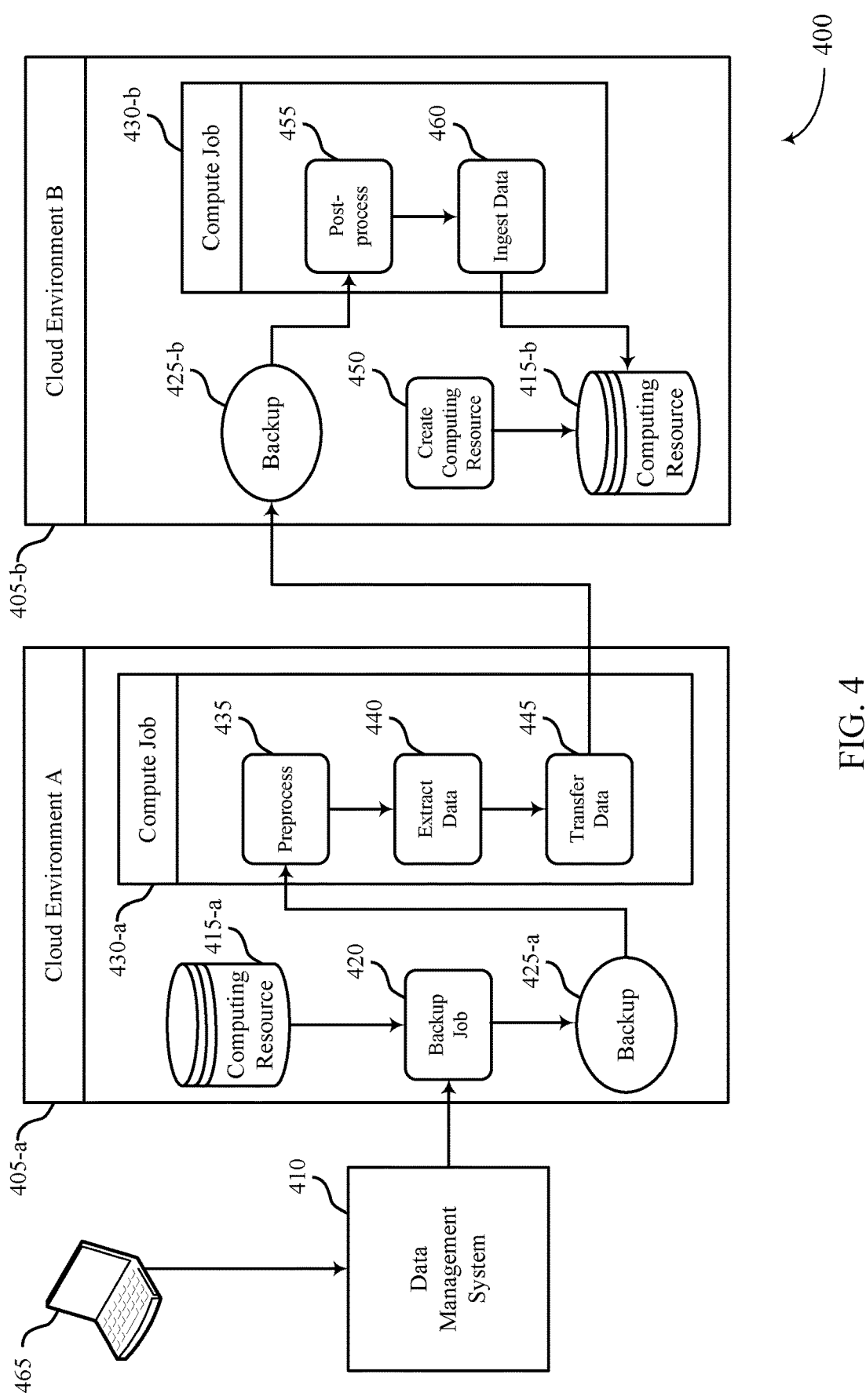
FIG. 4 illustrates an example of a cloud computing architecture that supports computing resource migration across cloud environments in accordance with aspects of the present disclosure.

FIG. 4 illustrates an example of a cloud computing architecture 400 that supports computing resource migration across cloud environments in accordance with aspects of the present disclosure. In some examples, the cloud computing architecture 400 illustrates an example architecture of components that support resource migration across cloud environments 405 as described herein. The cloud computing architecture 400 includes a data management system 410, which may represent an example of a data management system 355 as described with reference to FIGS. 1 through 3. The cloud computing architecture 400 further includes a first cloud environment 405-a and a second cloud environment 405-b, which may represent examples of a cloud computing environment 185 as described with respect to FIGS. 1 through 3. The data management system 410 may include or be in communication with a user interface 465, which may be accessed by a client or user to manage data storage across cloud environments 405.

The cloud computing architecture 400 represents an example architecture of cloud services used by one or more clients or customers. A cloud platform (e.g., a computing platform for cloud computing) may be employed by many users to store, manage, and process data using a shared network of remote servers. Each of the cloud environments 405-*a* and 405-*b* may represent examples of a computing environment associated with a respective cloud platform that provides cloud services to one or more customers. For example, a cloud environment 405 may store and run one or more applications, computing resources, or data for multiple customers. The data and applications hosted by the cloud environment 405 may be stored virtually within the cloud environment 405, which may be referred to as off-premise storage, instead of on-premise storage in an on-premise environment at a customer (e.g., in-house storage of data). The cloud environments 405-*a* and 405-*b* may operate on or be associated with a same or different cloud platform or protocol (e.g., Amazon Web Services, Google Cloud Platform, etc.).

The data management system 410 may be a computing system employed to manage, process, backup, and restore data using a network of one or more computing devices. In the example of FIG. 4, the data management system 410 may be employed by a user to manage backup and restoration of data and other computing resources of the user that are stored within one or more cloud environments 405. That is, the data management system 410 may be configured to connect with and manage one or more cloud environments 405. The data management system 410 may, in some aspects, be referred to as a SaaS platform. The data management system 410 may provide a customer with centralized data management across multiple distributed data centers and/or cloud environments 405. For example, the data management system 410 may be operable to access and manage the cloud environment 405-*a*, the cloud environment 405-*b*, and one or more other cloud environments 405. The data management system 410 may create and store a unified system of record for information and enterprise applications running across the distributed cloud environments.

A customer may utilize a user interface 465 to access and interact with the data management system 410. The user interface 465 may represent an example of a web browser, or some other application or software accessible by a customer via a network connection (e.g., the Internet). Although the user interface 465 and the data management system 410 are illustrated as separate components in FIG. 4, it is to be understood that the user interface 465 and the data management system 410 may, in some aspects, be co-located or part of a same component or entity. For example, the data management system 410 may include a user interface 465 for interfacing with clients. Additionally or alternatively, the user interface 465 may include functionalities to support data management across cloud environments 405.

The data management system 410 may provide cloud-native protection for the customer across different cloud platforms. For example, the data management system 410 may indicate, to the customer via the user interface 465, a list of computing resources 415 which the customer has stored across multiple different cloud environments 405. Computing resources 415 as described herein may represent examples of data, virtual machines, virtual disks, software instances, computing instances, applications executing on the cloud, or any other computing resources. The customer may utilize the user interface 465 to select one or more of the computing resources 415 for backup and protection. The data management system 410 may be operable to instruct the corresponding cloud environment 405 that stores the selected computing resource(s) 415 to generate and store cloud-native backups 425 of the computing resource(s) 415. The backups 425 may be in the form of incremental snapshots, full images, or other types of data backups.

Techniques described herein provide for the data management system 410 to facilitate migration of computing resources 415 between different cloud environments 405. A user may request, via the user interface 465, that a computing resource be transferred from a first (source) cloud environment 405 (e.g., cloud environment A in FIG. 4) to a second (target) cloud environment 405 (e.g., cloud environment B in FIG. 4). The data management system 410 as described herein may facilitate the requested transfer of the computing resource using a cloud-native transfer between the cloud environments 405.

The described techniques may provide for the user to transfer or migrate computing resource between different cloud platforms efficiently, which may reduce costs, improve security and reliability of data backups, and promote public cloud adoption as compared with techniques for manually migrating resources between cloud platforms. For example, a user may request to migrate one or more computing resources 415 between cloud environments based on reduced costs associated with a target cloud environment 405. The user may select a cheapest option for each cloud service and migrate computing resources 415 between cloud environments 405 accordingly to reduce total costs. Additionally or alternatively, a source cloud environment 405 may be associated with a certain vulnerability or error that may affect all computing resources 415 of a certain cloud service on the source cloud environment. In such cases, the user may request to migrate the computing resource(s) 415 to a target cloud environment 405 to refrain from interrupting business due to the vulnerabilities.

In the example of FIG. 4, the customer may request to transfer the computing resource 415-*a* from the first cloud environment 405-*a* to the second cloud environment 405-*b*. The first and second cloud environments 405 may be deployed or supported by different types of cloud vendors. As such, the first and second cloud environments 405 may operate different cloud protocols. Although the techniques are described with reference to two cloud environments 405-*a* and 405-*b*, it is to be understood that the described methods for transferring computing resources 415 may be applied to any quantity of cloud environments 405 that operate the same or different cloud protocols.

The customer may send one or more grants of permission for the data management system 410 to access the customer's enterprise data on each of the cloud environments 405-*a* and 405-*b*. For instance, the customer may add both of the cloud environments 405-*a* and 405-*b* to a user profile in the user interface 465. The grants of permission may provide for the data management system 410 to access and manage the computing resources 415 associated with the customer on both of the cloud environments 405-*a* and 405-*b*. In some aspects, the grants of permission may be part of the request to migrate the computing resource 415-*a*. Additionally or alternatively, the customer may provide the grants of permission before or after requesting to transfer the computing resource 415-*a*.

After receiving the grants of permission and the request, the data management system 410 may verify that a recent backup 425 of the computing resource 415-*a* has been obtained and is stored on the first cloud environment 405-*a*. The data management system 410 may generate a backup job 420 (e.g., a background job) in the first cloud environment 405-*a* to acquire the backup 425-*a* of the computing resource 415-*a*. The first cloud environment 405-*a* may execute the backup job 420 to generate a snapshot of a first state of the first computing resource 415-*a* at a first point in time and store the snapshot (e.g., the backup 425-*a*) within the first cloud environment 405-*a*.

The data management system 410 may generate the backup job 420 to obtain the backup 425-*a* in response to receiving the request to migrate the first computing resource 415-*a* to the second cloud environment 405-*b*. Additionally or alternatively, the data management system 410, the cloud environment 405-*a*, or both may generate the backup job 420 periodically or semi-statically to ensure that multiple backups 425 of the first computing resource 415-*a* are being acquired and stored. In such cases, the data management system 410 may use the backup 425-*a* based on the backup 425-*a* being acquired within a threshold time period of a first time at which the request is received from the user (e.g., a most recent backup 425-*a*).

The data management system 410 may generate a compute job 430-*a* on the first cloud environment 405-*a*. The data management system 410 may generate the compute job 430-*a* in response to the request, after verifying that the backup 425-*a* has been obtained, or both. The data management system 410 may instruct the first cloud environment 405-*a* to execute the compute job 430-*a*, or the first cloud environment 405-*a* may execute the compute job 430-*a* in response to the compute job 430-*a* being generated. To first compute job 430-*a* may be an example of a transient computing instance of the first cloud environment 405-*a* that may instruct or cause the first cloud environment 405-*a* to extract data from the backup 425-*a* of the first computing resource 415-*a* and transfer the data to the second cloud environment 405-*b*. The data management system 410 may generate the compute job 430-*a* to perform the extraction and transferal of the data using cloud-native computing instances and resources, such that the data does not leave the cloud environments 405. An example method for extracting and transferring the data is described herein, and in further detail with reference to FIG. 5.

At 435, as part of executing the compute job 430-*a*, the first cloud environment 405-*a* may preprocess the backup 425-*a*. If the backup 425-*a* includes incremental snapshots of the first computing resource 415-*a*, or other incremental images or shards of data, the preprocessing may include incorporating the incremental snapshots to obtain or generate a full backup 425 or image of the first state of the first computing resource 415-*a*. In some aspects, the preprocessing may include converting a format of the backup 425-*a*. For example, the full backup 425 may have a same or different format as the incremental backup 425-*a*. In some aspects, the backup 425-*a* may have a format that is supported by the first cloud environment 405-*a*, and the preprocessing may include converting the format to a first format that may be proprietary to the data management system 410 or a vendor that deploys the data management system 410 and that is compatible with the first cloud environment 405-*a*. For example, the data management system 410 may support a proprietary format of backups 425 for each different cloud computing platform. Additionally or alternatively, the first format may be used by or associated with the first cloud environment 405-*a*.

At 440, the first cloud environment 405-*a* may extract data from the processed backup of the computing resource 415-*a*. The first cloud environment 405-*a* may, in some aspects, generate a second backup 425-*b* that has a second format that is supported by the second cloud environment 405-*b*, as described in further detail elsewhere herein, including with reference to FIG. 5. In some aspects, the second format may be proprietary to the data management system 410 and compatible with the second cloud environment 405-*b*. At 445, the first cloud environment 405-*a* may transfer the extracted data to the second cloud environment 405-*b* as part of executing the compute job 430-*a*. In some aspects, to transfer the data, the first cloud environment 405-*a* may transfer the second backup 425 having the second format to the second cloud environment 405-*b*.

The data management system 410 may instruct the second cloud environment 405-*b* to generate, or create, a second computing resource 415-*b* within the second cloud environment 405-*b*. The data management system 410 may send the instructions to generate the second computing resource 415-*b* in response to the request, after the first compute job 430-*a* is complete, or after generating the first compute job 430-*a* (e.g., in parallel or concurrently with execution of the first compute job 430-*a*). The data management system 410 may instruct the second cloud environment 405-*b* to generate the second computing resource 415-*b* based on configuration information received from the user via the user interface 465, based on one or more parameters associated with the first computing resource 415-*a* on the first cloud environment 405-*a*, or both.

In some aspects, some configuration settings for a computing resource 415 may be different for different cloud environments 405 (e.g., cloud-specific parameters). The user may send configuration information for the second computing resource 415-*b* to the data management system 410 via the user interface 465 to configure such settings. For example, the user may input one or more computing resource parameters or configuration settings for the new computing resource 415-*b* to be generated in the second cloud environment 405-*b* and used as a target resource for migration of the first computing resource 415-*a*. Additionally or alternatively, one or more configuration settings and other parameters associated with the first computing resource 415-*a* on the first cloud environment 405-*a* may be reused and applied to the generation of the second computing resource 415-*b* on the second cloud environment 405-*b* (e.g., resource-specific parameters, such as a size, memory parameters).

At 450, the second cloud environment 405-*b* may create the second computing resource 415-*b* based on the instructions. The second computing resource 415-*b* generated on the second cloud environment 405-*b* may be an empty or null resource (e.g., the resource may not include data). For example, if the first computing resource 415-*a* is a virtual machine, the second computing resource 415-*b* may be generated as a virtual machine with empty virtual disks. In some aspects, the second cloud environment 405-*b* may refrain from creating the second computing resource 415-*b*. For example, if a computing resource 415 is already on the second cloud environment 405-*b* that is compatible with the first computing resource 415-*a*, the second cloud environment 405-*b* may use that resource.

The data management system 410 may subsequently generate a second compute job 430-*b* in the second cloud environment 405-*b*. The second compute job 430-*b* may instruct or cause the second cloud environment 405-*b* to load the data from the transferred backup 425-*b* into the second computing resource 415-*b* generated in the second cloud environment 405-*b*. An example method for executing the second compute job 430-*b* to load or restore the data to the second computing resource 415-*b* is described herein, and with reference to FIG. 5.

At 455, the second cloud environment 405-*b* may perform post-processing on the backup 425-*b*. The post-processing may, in some aspects, include converting the data transferred to the second cloud environment 405-*b* from the second format of the backup 425-*b* to a third format that is compatible with or supported by the second computing resource 415-*b*. For example, the second format of the backup 425-*b* may correspond to a format that is proprietary to the data management system 410 and compatible with the second cloud environment 405-*b*. The third format may correspond to a format that is supported by and used within the second cloud environment 405-*b*. At 460, the second cloud environment 405-*b* may ingest, or load the data into the computing resource 415-*b* after performing the post-processing. Ingesting the data may be referred to as restoring the data to the compute resource 415-*b* on the second cloud environment 405-*b*. In some aspects, if the second cloud environment 405-*b* uses an existing computing resource 415-*b* instead of creating an empty computing resource 415-*b*, the data ingested into the second computing resource 415-*b* may override data that is currently stored on the second computing resource 415-*b*.

The data management system 410 described herein may thereby interface with a user and two or more cloud environments 405 that operate two or more different cloud protocols to manage and migrate data and other computing resources 415 between the cloud environments 405. The user may select which computing resources 415 to migrate at a given time with reduced latency and complexity, which may improve security and reduce costs.

Figure 5:
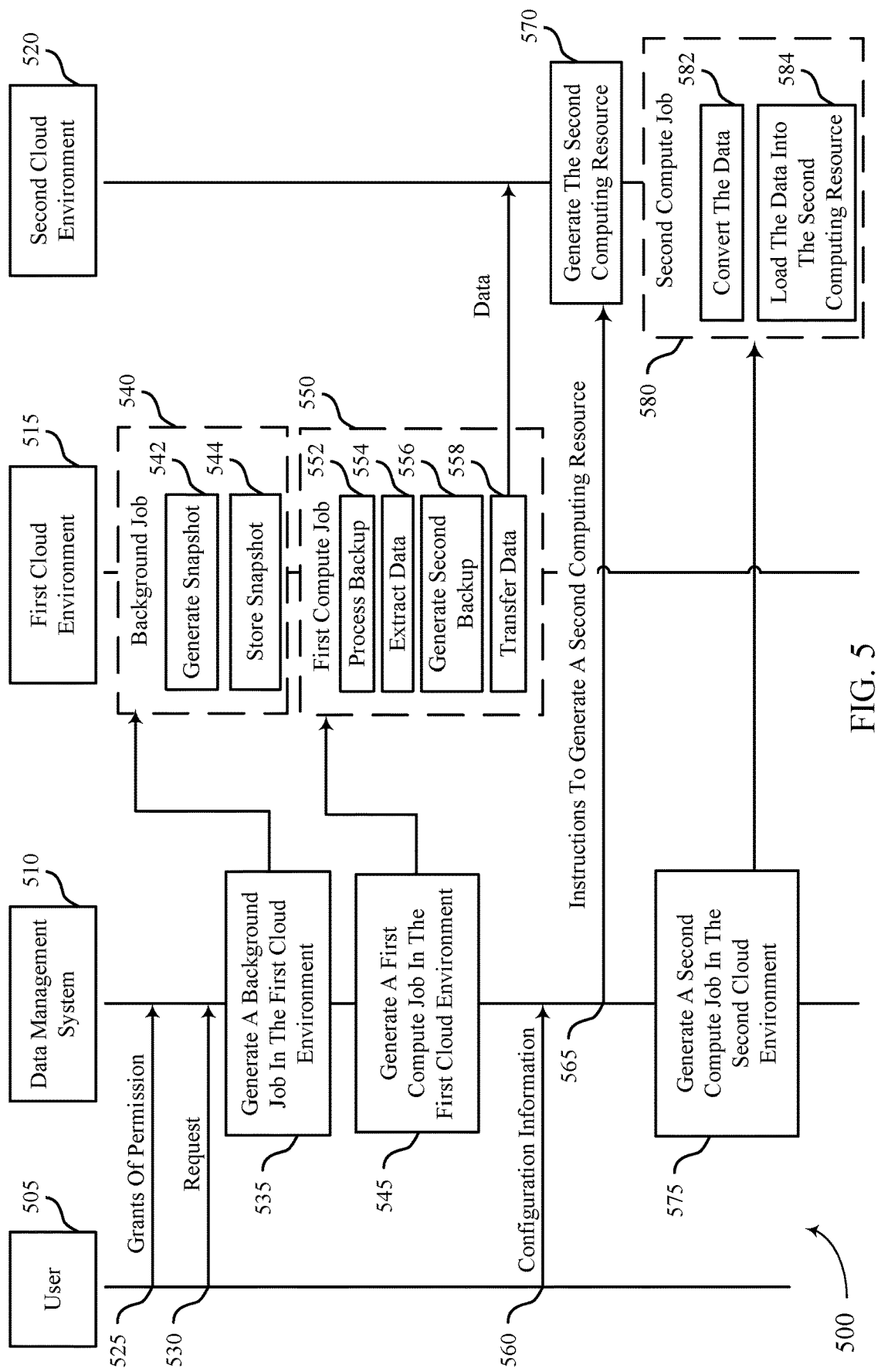
FIG. 5 illustrates an example of a process flow that supports computing resource migration across cloud environments in accordance with aspects of the present disclosure.

FIG. 5 illustrates an example of a process flow 500 that supports computing resource migration across cloud environments in accordance with aspects of the present disclosure. The process flow 500 may implement or be implemented by aspects of the cloud computing architecture 400 described with reference to FIG. 4. For example, the process flow 500 may be implemented by a user 505, a data management system 510, a first cloud environment 515, and a second cloud environment 520, which may each represent examples of corresponding components as described with reference to FIGS. 1-4. The process flow 500 may describe a method for transferring a computing resource from the first cloud environment 515 to the second cloud environment 520 using cloud-native resources. The data management system 510 may be configured to interface with the first cloud environment 515, the second cloud environment 520, and the user 505.

In some aspects, the operations illustrated in the process flow 500 may be performed by hardware (e.g., including circuitry, processing blocks, logic components, and other components), code (e.g., software or firmware) executed by a processor, or any combination thereof. For example, aspects of the process flow 500 may be implemented or managed by a cloud data management service, or some other software or application within a data management system 510 that is configured to manage backup and restoration of data and other computing resources within one or more cloud environments. Alternative examples of the following may be implemented, where some steps are performed in a different order than described or are not performed at all. In some cases, steps may include additional features not mentioned below, or further steps may be added.

At 525, the data management system 510 may receive, from the user 505, one or more grants of permission for the data management system 510 to access the first cloud environment 515 and the second cloud environment 520. The user 505 may provide the one or more grants of permission directly to the data management system 510. Additionally or alternatively, the data management system 510 may receive the one or more grants of permission from the user 505 via a user interface, such as the user interface 465 described with reference to FIG. 4. The data management system 510 may access enterprise data for the user 505 that is stored on the cloud environment 515 and the cloud environment 520 based on the one or more grants of permission.

At 530, the data management system 510 may receive, from the user 505, a request to migrate a first computing resource stored in the first cloud environment 515 to the second cloud environment 520. In some aspects, the request may be transmitted by the user 505 before, at the same time as, or after the one or more grants of permission. Additionally or alternatively, the request may include the one or more grants of permission. For example, a request to transfer the data may implicitly indicate permission for the data management system 510 to access both cloud environments. If the data management system 510 receives the grants of permission before the request, the data management system 510 may display (e.g., via a user interface) a list of each of the user's resources stored on each cloud environment, and the request may include a selection, by the user 505, of one or more of the resources to migrate.

At 535, the data management system 510 may generate a background job 540 in the first cloud environment 515. The background job 540 may represent an example of a backup job 420 described with reference to FIG. 4. The background job 540 may be operable to cause the first cloud environment 515 to generate and store a snapshot. For example, at 542, as part of executing the background job 540, the first cloud environment 515 may generate a snapshot of the first computing resource stored in the first cloud environment 515 at a first point in time. At 544, as part of executing the background job 540, the first cloud environment 515 may store the snapshot of the first computing resource at the first cloud environment 515 (e.g., in a database or other data storage device or appliance within the first cloud environment 515). The snapshot of the first computing resource stored at the first cloud environment 515 may include a backup of the first computing resource up to the first point in time.

The data management system 510 may generate the background job 540 to acquire the backup of the first computing resource in response to receiving the request at 530. Additionally or alternatively, the data management system 510 may generate a background job 540 periodically or semi-statically in the first cloud environment 515 to acquire multiple backups of the first computing resource. In such cases, the data management system 510 may select the backup of the computing resource from the multiple backups based on the backup being acquired within a threshold time period of a first time at which the request is received from the user.

At 545, the data management system 510 may generate a first compute job 550 in the first cloud environment 515. The first compute job 550 may represent an example of the compute job 430-*a* as described with reference to FIG. 4. For example, the first compute job 550 may be operable to cause the first cloud environment 515 to extract data from the backup of the first computing resource in the first cloud environment 515 and transfer the extracted data to the second cloud environment 520. At 552, the first cloud environment 515 may process the backup of the first computing resource. For example, the backup may include one or more incremental snapshots of the first computing resource, and the first cloud environment 515 may process the one or more incremental snapshots of the backup to obtain a full backup of the first computing resource. In some aspects, the processing may include converting a format of the backup of the first computing resource to a first format that is supported by the first cloud environment 515 and the data management system 510 (e.g., from a format supported and used within the first cloud environment 515).

At 554, the first cloud environment 515 may extract the data from the full backup of the first computing resource. In some examples, the extracting may include extracting data, metadata, or both. At 556, the first cloud environment may generate, after extracting the data from the backup of the first computing resource, a second backup of the first computing resource. The second backup may include the extracted data and may have a second format that is supported by the second cloud environment 520. That is, the first cloud environment 515 may further convert the backup from the first format supported by the data management system 510 and the first cloud environment 515 to the second format supported by the data management system 510 and the second cloud environment 520. At 558, as part of the first compute job 550, the first cloud environment 515 may transfer the second backup of the first computing resource corresponding to the second format to the second cloud environment 520. For example, the first cloud environment 515 may transmit the backed up data using the second format. The second cloud environment 520 may store the transferred data in a database or other data storage device or appliance within the second cloud environment 520.

At 560, in some aspects, the user 505 may transmit configuration information to the data management system 510. The configuration information may include parameters or other configuration settings associated with a second (target) computing resource to be generated on the second cloud environment 520. For example, the user 505 may request that the first computing resource is transferred to the second cloud environment 520 and restored to a second computing resource having certain configuration settings, which may be indicated to the data management system 510 via the configuration information. In some aspects, the user 505 may indicate the configuration information via the request transmitted at 530.

At 565, the data management system 510 may instruct the second cloud environment 520 to generate the second computing resource in the second cloud environment. The data management system 510 may instruct the second cloud environment 520 to generate the second computing resource after the first compute job is executed, or while the first compute job is executing. The data management system 510 may instruct the second cloud environment 520 to generate the second computing resource based on the configuration information received from the user 505, based on one or more resources associated with the first computing resource stored in the first cloud environment, or both, as described in further detail with reference to FIG. 4. At 570, the second cloud environment 520 may generate the second computing resource based on the instructions.

At 575, the data management system 510 may generate a second compute job 580 in the second cloud environment. The second compute job 580 may represent an example of the compute job 430-b described with reference to FIG. 4. For example, the second compute job 580 may be operable to cause the second cloud environment 520 to load the data extracted from the backup of the first computing resource in the first cloud environment 515 into the second computing resource generated in the second cloud environment 520.

At 582, as part of executing the second compute job 580, the second cloud environment 520 may convert the data transferred to the second cloud environment 520 from the second format to a third format that is compatible with the second computing resource generated in the second cloud environment 520, as described with reference to FIG. 4. At 584, after converting the data, the second cloud environment 520 may load the data into the second computing resource generated in the second cloud environment 520.

The data may thereby be transferred from the first computing resource on the first cloud environment 515 to the second cloud environment 520 and restored to the second computing resource. The user 505 may request transfer of any quantity of computing resources at any given time. In some aspects, the user 505 may request to transfer all of the user's enterprise data and computing resources from the first cloud environment 515 to the second cloud environment 520, or a subset of the user's enterprise data and computing resources. In some aspects, the user may restore the data from the second cloud environment 520. For example, the described migration techniques may be used to generate copies or backups of enterprise data on different cloud environments.

Figure 6:
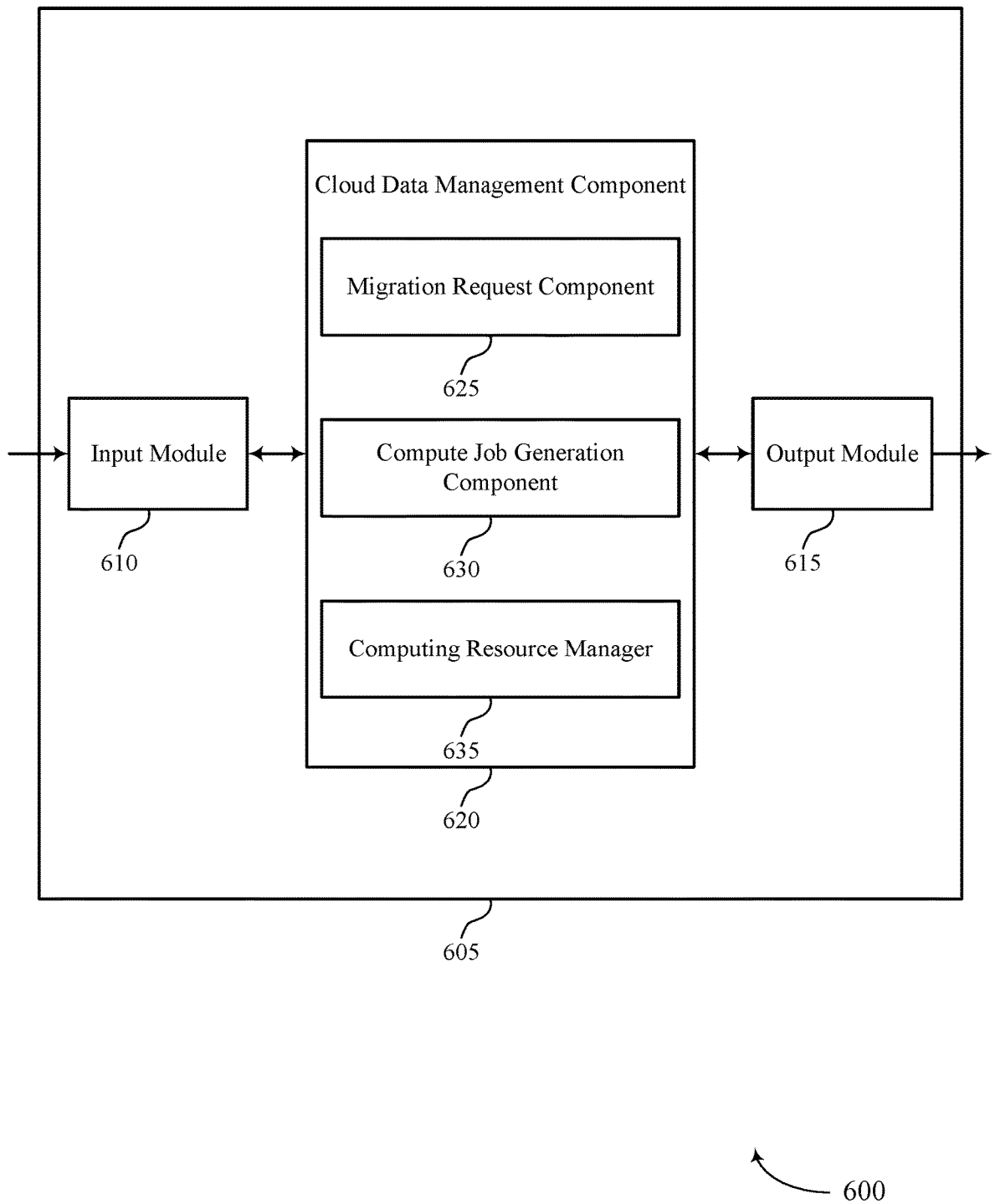
FIG. 6 shows a block diagram of an apparatus that supports computing resource migration across cloud environments in accordance with aspects of the present disclosure.

FIG. 6 shows a block diagram 600 of a device 605 that supports computing resource migration across cloud environments in accordance with aspects of the present disclosure. The device 605 may include an input module 610, an output module 615, and a cloud data management component 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the cloud data management component 620 to support computing resource migration across cloud environments. In some cases, the input module 610 may be a component of a network interface 810 as described with reference to FIG. 8.

The output module 615 may manage output signals for the device 605. For example, the output module 615 may receive signals from other components of the device 605, such as the cloud data management component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of a network interface 810 as described with reference to FIG. 8.

For example, the cloud data management component 620 may include a migration request component 625, a compute job generation component 630, a computing resource manager 635, or any combination thereof. In some examples, the cloud data management component 620, or various components thereof, may be configured to perform various operations (e.g., receiving, monitoring, transmitting) using or otherwise in cooperation with the input module 610, the output module 615, or both. For example, the cloud data management component 620 may receive information from the input module 610, send information to the output module 615, or be integrated in combination with the input module 610, the output module 615, or both to receive information, transmit information, or perform various other operations as described herein.

The migration request component 625 may be configured as or otherwise support a means for receiving, at a data management system configured to interface with a first cloud environment and a second cloud environment, a request to migrate a first computing resource stored in the first cloud environment to the second cloud environment. The compute job generation component 630 may be configured as or otherwise support a means for generating, by the data management system based on receiving the request, a first compute job in the first cloud environment, where the first compute job is operable to cause the first cloud environment to extract data from a backup of the first computing resource in the first cloud environment and transfer the data to the second cloud environment. The computing resource manager 635 may be configured as or otherwise support a means for instructing, by the data management system based on receiving the request, the second cloud environment to generate a second computing resource in the second cloud environment. The compute job generation component 630 may be configured as or otherwise support a means for generating, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment.

Figure 7:
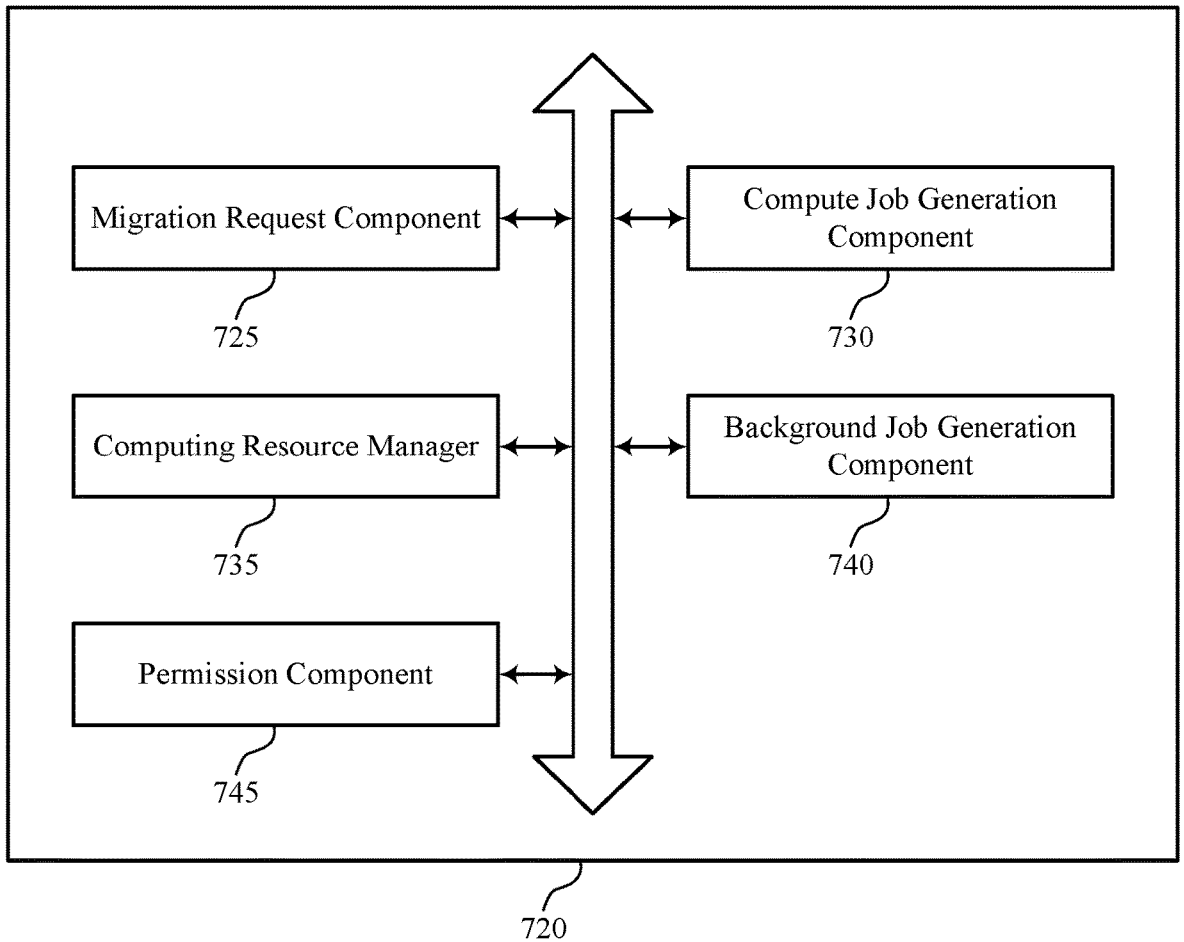
FIG. 7 shows a block diagram of a cloud data management component that supports computing resource migration across cloud environments in accordance with aspects of the present disclosure.

FIG. 7 shows a block diagram 700 of a cloud data management component 720 that supports computing resource migration across cloud environments in accordance with aspects of the present disclosure. The cloud data management component 720 may be an example of aspects of a cloud data management component or a cloud data management component 620, or both, as described herein. The cloud data management component 720, or various components thereof, may be an example of means for performing various aspects of computing resource migration across cloud environments as described herein. For example, the cloud data management component 720 may include a migration request component 725, a compute job generation component 730, a computing resource manager 735, a background job generation component 740, a permission component 745, or any combination thereof. Each of these components may communicate, directly or indirectly, with one another (e.g., via one or more buses).

The migration request component 725 may be configured as or otherwise support a means for receiving, at a data management system configured to interface with a first cloud environment and a second cloud environment, a request to migrate a first computing resource stored in the first cloud environment to the second cloud environment. The compute job generation component 730 may be configured as or otherwise support a means for generating, by the data management system based on receiving the request, a first compute job in the first cloud environment, where the first compute job is operable to cause the first cloud environment to extract data from a backup of the first computing resource in the first cloud environment and transfer the data to the second cloud environment. The computing resource manager 735 may be configured as or otherwise support a means for instructing, by the data management system based on receiving the request, the second cloud environment to generate a second computing resource in the second cloud environment. In some examples, the compute job generation component 730 may be configured as or otherwise support a means for generating, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment.

In some examples, the background job generation component 740 may be configured as or otherwise support a means for generating, by the data management system, a background job in the first cloud environment to acquire the backup of the first computing resource. The background job may be operable to cause the first cloud environment to generate a snapshot of the first computing resource stored in the first cloud environment at a first point in time and store the snapshot of the first computing resource at the first cloud environment, where the snapshot of the first computing resource stored at the first cloud environment includes the backup of the first computing resource.

In some examples, to support generating the background job, the background job generation component 740 may be configured as or otherwise support a means for generating the background job to acquire the backup of the first computing resource in response to receiving the request to migrate the first computing resource stored in the first cloud environment to the second cloud environment. In some examples, to support generating the background job, the background job generation component 740 may be configured as or otherwise support a means for generating the background job periodically or semi-statically to acquire a set of multiple backups of the first computing resource, where the backup is included in the set of multiple backups, and where generating the first compute job to extract the data from the backup is based on the backup being acquired within a threshold time period of a first time at which the request is received.

In some examples, the backup may include one or more incremental snapshots of the first computing resource, and the first compute job may be configured or otherwise support a means for causing the first cloud environment to process the one or more incremental snapshots of the backup to obtain a full backup of the first computing resource, the full backup having a first format supported by the first cloud environment, where extracting the data from the backup includes extracting the data from the full backup of the first computing resource.

In some examples, the first compute job may be configured or otherwise support a means for causing the first cloud environment to generate, after extracting the data from the backup of the first computing resource, a second backup of the first computing resource, the second backup including the data and having a second format that is supported by the second cloud environment, where transferring the data from the first cloud environment to the second cloud environment as part of the first compute job includes transferring the second backup of the first computing resource corresponding to the second format.

In some examples, to support instructing the second cloud environment to generate the second computing resource, the computing resource manager 735 may be configured as or otherwise support a means for instructing, after the first compute job is executed, the second cloud environment to generate the second computing resource based on configuration information received by the data management system, the configuration information indicating one or more parameters associated with the second computing resource. In some examples, to support instructing the second cloud environment to generate the second computing resource, the computing resource manager 735 may be configured as or otherwise support a means for instructing the second cloud environment to generate the second computing resource based on one or more parameters associated with the first computing resource stored in the first cloud environment.

In some examples, the second compute job may be configured or otherwise support a means for causing the second cloud environment to convert the data transferred to the second cloud environment from a second format to a third format that is compatible with the second computing resource before loading the data into the second computing resource generated in the second cloud environment.

In some examples, the permission component 745 may be configured as or otherwise support a means for receiving, at the data management system, one or more grants of permission for the data management system to access the first cloud environment and the second cloud environment, where generating the first compute job and generating the second compute job is based on the one or more grants of permission.

Figure 8:
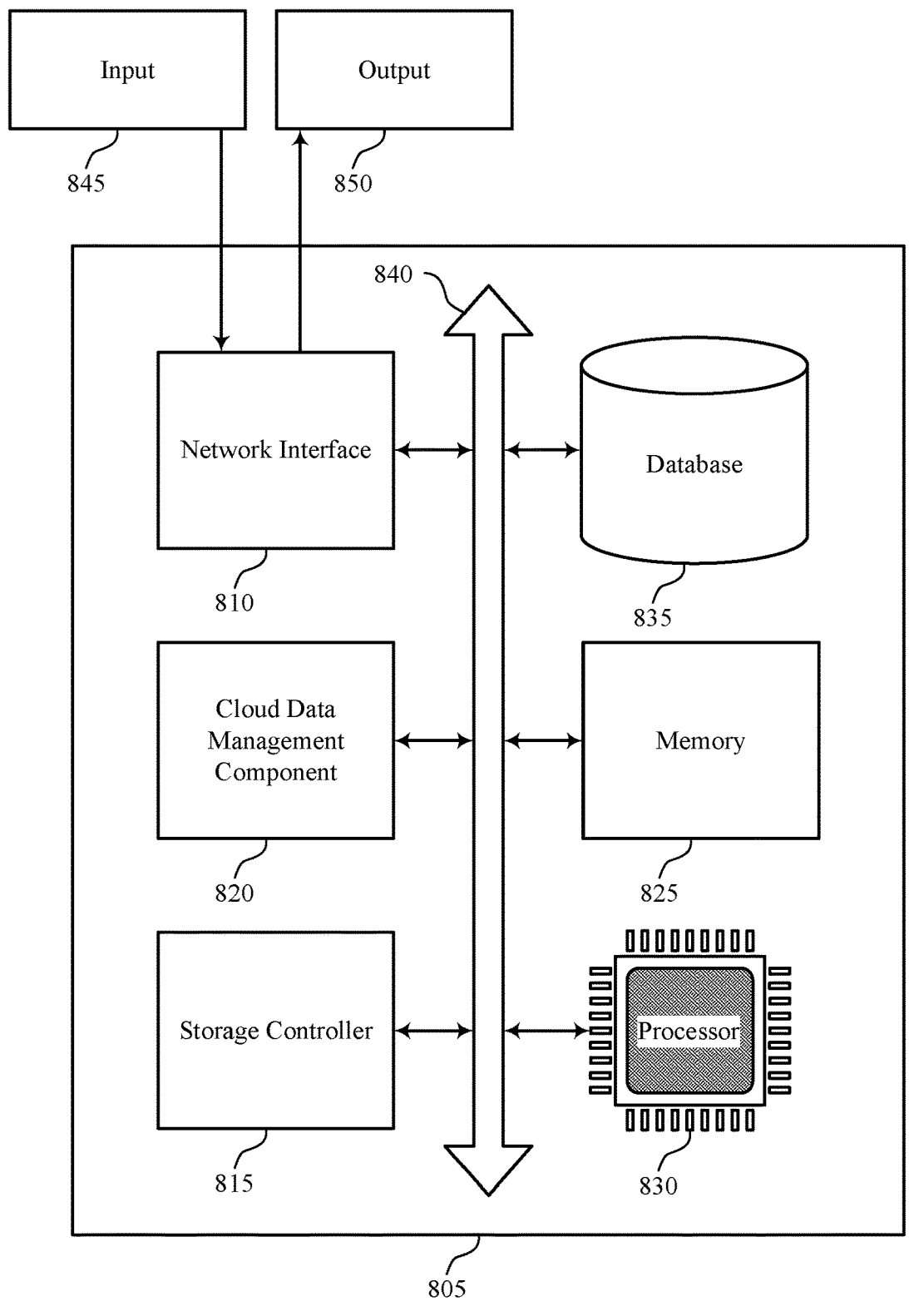
FIG. 8 shows a diagram of a system including a device that supports computing resource migration across cloud environments in accordance with aspects of the present disclosure.

FIG. 8 shows a diagram of a system 800 including a device 805 that supports computing resource migration across cloud environments in accordance with aspects of the present disclosure. The device 805 may be an example of or include the components of a device 605 as described herein. The device 805 may include components for bi-directional data communications including components for transmitting and receiving communications, such as a cloud data management component 820, a network interface 810, a storage controller 815, a memory 825, a processor 830, and a database 835. These components may be in electronic communication or otherwise coupled (e.g., operatively, communicatively, functionally, electronically, electrically) via one or more buses (e.g., a bus 840).

The network interface 810 may manage input signals 845 and output signals 850 for the device 805. The network interface 810 may also manage peripherals not integrated into the device 805. In some cases, the network interface 810 may represent a physical connection or port to an external peripheral. In some cases, the network interface 810 may utilize an operating system such as iOS®, ANDROID®, MS-DOS®, MS-WINDOWS®, OS/2®, UNIX®, LINUX®, or another known operating system. In other cases, the network interface 810 may represent or interact with a modem, a keyboard, a mouse, a touchscreen, or a similar device. In some cases, the network interface 810 may be implemented as part of a processor 830. In some examples, a user may interact with the device 805 via the network interface 810 or via hardware components controlled by the network interface 810.

The storage controller 815 may manage data storage and processing in a database 835. In some cases, a user may interact with the storage controller 815. In other cases, the storage controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting computing resource migration across cloud environments).

For example, the cloud data management component 820 may be configured as or otherwise support a means for receiving, at a data management system configured to interface with a first cloud environment and a second cloud environment, a request to migrate a first computing resource stored in the first cloud environment to the second cloud environment. The cloud data management component 820 may be configured as or otherwise support a means for generating, by the data management system based on receiving the request, a first compute job in the first cloud environment, where the first compute job is operable to cause the first cloud environment to extract data from a backup of the first computing resource in the first cloud environment and transfer the data to the second cloud environment. The cloud data management component 820 may be configured as or otherwise support a means for instructing, by the data management system based on receiving the request, the second cloud environment to generate a second computing resource in the second cloud environment. The cloud data management component 820 may be configured as or otherwise support a means for generating, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment.

By including or configuring the cloud data management component 820 in accordance with examples as described herein, the device 805 may support techniques for improved reliability and security associated with data backup and restoration across cloud environments, reduced latency and complexity associated with migrating data and other computing resources between cloud environments, and more efficient utilization of communication resources. Additionally or alternatively, the device 805 may provide for reduced costs and improved efficiency for a customer.

Figure 9:
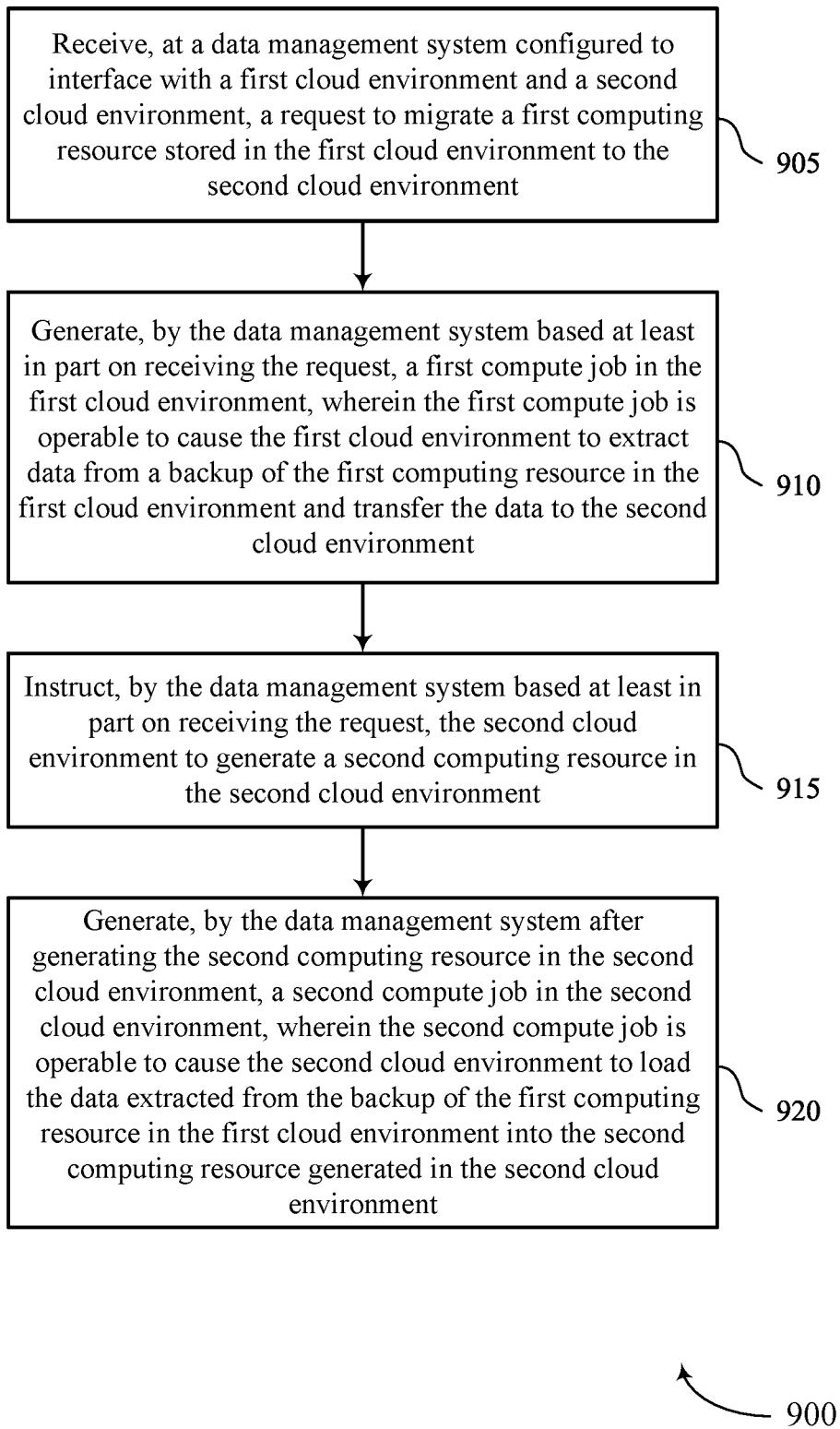
FIGS. 9 through 11 show flowcharts illustrating methods that support computing resource migration across cloud environments in accordance with aspects of the present disclosure.

FIG. 9 shows a flowchart illustrating a method 900 that supports computing resource migration across cloud environments in accordance with aspects of the present disclosure. The operations of the method 900 may be implemented by a data management system or its components as described herein. For example, the operations of the method 900 may be performed by a data management system as described with reference to FIGS. 1 through 8. In some examples, a data management system may execute a set of instructions to control the functional elements of the data management system to perform the described functions. Additionally, or alternatively, the data management system may perform aspects of the described functions using special-purpose hardware.

At 905, the method may include receiving, at a data management system configured to interface with a first cloud environment and a second cloud environment, a request to migrate a first computing resource stored in the first cloud environment to the second cloud environment. The operations of 905 may be performed in accordance with examples as disclosed herein. In some examples, aspects of the operations of 905 may be performed by a migration request component 725 as described with reference to FIG. 7.

At 910, the method may include generating, by the data management system based on receiving the request, a first compute job in the first cloud environment, where the first compute job is operable to cause the first cloud environment to extract data from a backup of the first computing resource in the first cloud environment and transfer the data to the second cloud environment. The operations of 910 may be performed in accordance with examples as disclosed herein. In some examples, aspects of the operations of 910 may be performed by a compute job generation component 730 as described with reference to FIG. 7.

At 915, the method may include instructing, by the data management system based on receiving the request, the second cloud environment to generate a second computing resource in the second cloud environment. The operations of 915 may be performed in accordance with examples as disclosed herein. In some examples, aspects of the operations of 915 may be performed by a computing resource manager 735 as described with reference to FIG. 7.

At 920, the method may include generating, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment. The operations of 920 may be performed in accordance with examples as disclosed herein. In some examples, aspects of the operations of 920 may be performed by a compute job generation component 730 as described with reference to FIG. 7.

Figure 10:
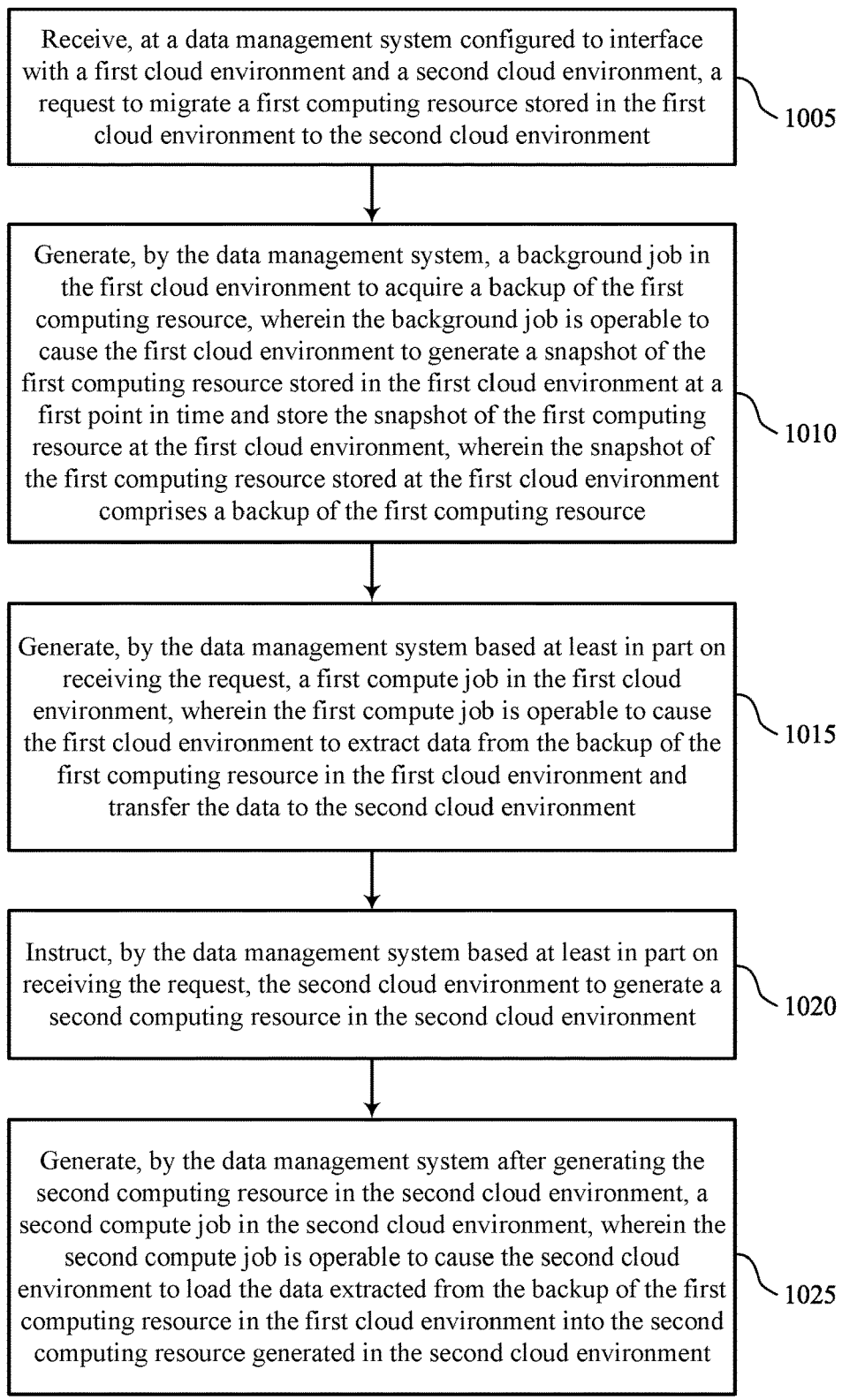

FIG. 10 shows a flowchart illustrating a method 1000 that supports computing resource migration across cloud environments in accordance with aspects of the present disclosure. The operations of the method 1000 may be implemented by a data management system or its components as described herein. For example, the operations of the method 1000 may be performed by a data management system as described with reference to FIGS. 1 through 8. In some examples, a data management system may execute a set of instructions to control the functional elements of the data management system to perform the described functions. Additionally, or alternatively, the data management system may perform aspects of the described functions using special-purpose hardware.

At 1005, the method may include receiving, at a data management system configured to interface with a first cloud environment and a second cloud environment, a request to migrate a first computing resource stored in the first cloud environment to the second cloud environment. The operations of 1005 may be performed in accordance with examples as disclosed herein. In some examples, aspects of the operations of 1005 may be performed by a migration request component 725 as described with reference to FIG. 7.

At 1010, the method may include generating, by the data management system, a background job in the first cloud environment to acquire the backup of the first computing resource, where the background job is operable to cause the first cloud environment to generate a snapshot of the first computing resource stored in the first cloud environment at a first point in time and store the snapshot of the first computing resource at the first cloud environment, where the snapshot of the first computing resource stored at the first cloud environment includes the backup of the first computing resource. The operations of 1010 may be performed in accordance with examples as disclosed herein. In some examples, aspects of the operations of 1010 may be performed by a background job generation component 740 as described with reference to FIG. 7.

At 1015, the method may include generating, by the data management system based on receiving the request, a first compute job in the first cloud environment, where the first compute job is operable to cause the first cloud environment to extract data from the backup of the first computing resource in the first cloud environment and transfer the data to the second cloud environment. The operations of 1015 may be performed in accordance with examples as disclosed herein. In some examples, aspects of the operations of 1015 may be performed by a compute job generation component 730 as described with reference to FIG. 7.

At 1020, the method may include instructing, by the data management system based on receiving the request, the second cloud environment to generate a second computing resource in the second cloud environment. The operations of 1020 may be performed in accordance with examples as disclosed herein. In some examples, aspects of the operations of 1020 may be performed by a computing resource manager 735 as described with reference to FIG. 7.

At 1025, the method may include generating, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment. The operations of 1025 may be performed in accordance with examples as disclosed herein. In some examples, aspects of the operations of 1025 may be performed by a compute job generation component 730 as described with reference to FIG. 7.

Figure 11:
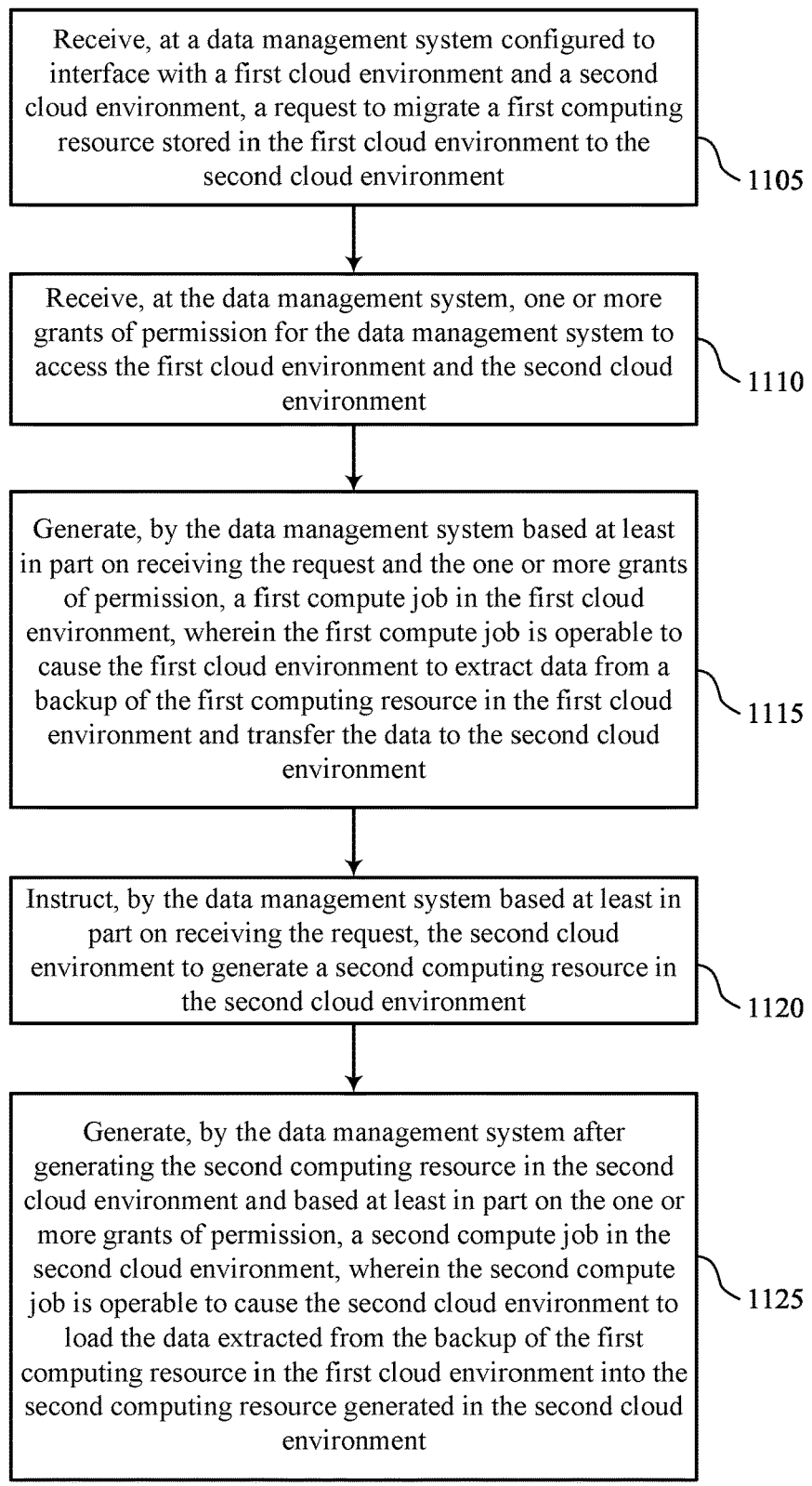

FIG. 11 shows a flowchart illustrating a method 1100 that supports computing resource migration across cloud environments in accordance with aspects of the present disclosure. The operations of the method 1100 may be implemented by a data management system or its components as described herein. For example, the operations of the method 1100 may be performed by a data management system as described with reference to FIGS. 1 through 8. In some examples, a data management system may execute a set of instructions to control the functional elements of the data management system to perform the described functions.

Additionally, or alternatively, the data management system may perform aspects of the described functions using special-purpose hardware.

At 1105, the method may include receiving, at a data management system configured to interface with a first cloud environment and a second cloud environment, a request to migrate a first computing resource stored in the first cloud environment to the second cloud environment. The operations of 1105 may be performed in accordance with examples as disclosed herein. In some examples, aspects of the operations of 1105 may be performed by a migration request component 725 as described with reference to FIG. 7.

At 1110, the method may include receiving, at the data management system, one or more grants of permission for the data management system to access the first cloud environment and the second cloud environment. The operations of 1110 may be performed in accordance with examples as disclosed herein. In some examples, aspects of the operations of 1110 may be performed by a permission component 745 as described with reference to FIG. 7.

At 1115, the method may include generating, by the data management system based on receiving the request and the one or more grants of permission, a first compute job in the first cloud environment, where the first compute job is operable to cause the first cloud environment to extract data from a backup of the first computing resource in the first cloud environment and transfer the data to the second cloud environment. The operations of 1115 may be performed in accordance with examples as disclosed herein. In some examples, aspects of the operations of 1115 may be performed by a compute job generation component 730 as described with reference to FIG. 7.

At 1120, the method may include instructing, by the data management system based on receiving the request, the second cloud environment to generate a second computing resource in the second cloud environment. The operations of 1120 may be performed in accordance with examples as disclosed herein. In some examples, aspects of the operations of 1120 may be performed by a computing resource manager 735 as described with reference to FIG. 7.

At 1125, the method may include generating, by the data management system after generating the second computing resource in the second cloud environment and based on the one or more grants of permission, a second compute job in the second cloud environment, where the second compute job is operable to cause the second cloud environment to load the data extracted from the backup of the first computing resource in the first cloud environment into the second computing resource generated in the second cloud environment. The operations of 1125 may be performed in accordance with examples as disclosed herein. In some examples, aspects of the operations of 1125 may be performed by a compute job generation component 730 as described with reference to FIG. 7.

A method is described. The method may include receiving, at a data management system configured to interface with a first cloud environment and a second cloud environment, a request to migrate a first computing resource stored in the first cloud environment to the second cloud environment, generating, by the data management system based on receiving the request, a first compute job in the first cloud environment, where the first compute job is operable to cause the first cloud environment to extract data from a backup of the first computing resource in the first cloud environment and transfer the data to the second cloud environment, instructing, by the data management system based on receiving the request, the second cloud environment to generate a second computing resource in the second cloud environment, and generating, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment.

An apparatus is described. The apparatus may include a processor, memory coupled with the processor, and instructions stored in the memory. The instructions may be executable by the processor to cause the apparatus to receive, at a data management system configured to interface with a first cloud environment and a second cloud environment, a request to migrate a first computing resource stored in the first cloud environment to the second cloud environment, generate, by the data management system based on receiving the request, a first compute job in the first cloud environment, where the first compute job is operable to cause the first cloud environment to extract data from a backup of the first computing resource in the first cloud environment and transfer the data to the second cloud environment, instruct, by the data management system based on receiving the request, the second cloud environment to generate a second computing resource in the second cloud environment, and generate, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment.

Another apparatus is described. The apparatus may include means for receiving, at a data management system configured to interface with a first cloud environment and a second cloud environment, a request to migrate a first computing resource stored in the first cloud environment to the second cloud environment, means for generating, by the data management system based on receiving the request, a first compute job in the first cloud environment, where the first compute job is operable to cause the first cloud environment to extract data from a backup of the first computing resource in the first cloud environment and transfer the data to the second cloud environment, means for instructing, by the data management system based on receiving the request, the second cloud environment to generate a second computing resource in the second cloud environment, and means for generating, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment.

A non-transitory computer-readable medium storing code is described. The code may include instructions executable by a processor to receive, at a data management system configured to interface with a first cloud environment and a second cloud environment, a request to migrate a first computing resource stored in the first cloud environment to the second cloud environment, generate, by the data management system based on receiving the request, a first compute job in the first cloud environment, where the first compute job is operable to cause the first cloud environment to extract data from a backup of the first computing resource in the first cloud environment and transfer the data to the second cloud environment, instruct, by the data management system based on receiving the request, the second cloud environment to generate a second computing resource in the second cloud environment, and generate, by the data management system after generating the second computing resource in the second cloud environment, a second compute job in the second cloud environment, where the second compute job is operable to cause the second cloud environment to load the data extracted from the backup of the first computing resource in the first cloud environment into the second computing resource generated in the second cloud environment.

Some examples of the method, apparatuses, and non-transitory computer-readable medium described herein may further include operations, features, means, or instructions for generating, by the data management system, a background job in the first cloud environment to acquire the backup of the first computing resource, where the background job may be operable to cause the first cloud environment to generate a snapshot of the first computing resource stored in the first cloud environment at a first point in time and store the snapshot of the first computing resource at the first cloud environment, where the snapshot of the first computing resource stored at the first cloud environment includes the backup of the first computing resource.

In some examples of the method, apparatuses, and non-transitory computer-readable medium described herein, operations, features, means, or instructions for generating the background job may include operations, features, means, or instructions for generating the background job to acquire the backup of the first computing resource in response to receiving the request to migrate the first computing resource stored in the first cloud environment to the second cloud environment.

In some examples of the method, apparatuses, and non-transitory computer-readable medium described herein, operations, features, means, or instructions for generating the background job may include operations, features, means, or instructions for generating the background job periodically or semi-statically to acquire a set of multiple backups of the first computing resource, where the backup may be included in the set of multiple backups, and where generating the first compute job to extract the data from the backup may be based on the backup being acquired within a threshold time period of a first time at which the request may be received.

In some examples of the method, apparatuses, and non-transitory computer-readable medium described herein the backup may include one or more incremental snapshots of the first computing resource, and the first compute job may be further operable to cause the first cloud environment to process the one or more incremental snapshots of the backup to obtain a full backup of the first computing resource, the full backup having a first format supported by the first cloud environment, where extracting the data from the backup includes extracting the data from the full backup of the first computing resource.

In some examples of the method, apparatuses, and non-transitory computer-readable medium described herein, the first compute job may be further operable to cause the first cloud environment to generate, after extracting the data from the backup of the first computing resource, a second backup of the first computing resource, the second backup including the data and having a second format that may be supported by the second cloud environment, where transferring the data from the first cloud environment to the second cloud environment as part of the first compute job includes transferring the second backup of the first computing resource corresponding to the second format.

In some examples of the method, apparatuses, and non-transitory computer-readable medium described herein, operations, features, means, or instructions for instructing the second cloud environment to generate the second computing resource may include operations, features, means, or instructions for instructing, after the first compute job may be executed, the second cloud environment to generate the second computing resource based on configuration information received by the data management system, the configuration information indicating one or more parameters associated with the second computing resource.

In some examples of the method, apparatuses, and non-transitory computer-readable medium described herein, operations, features, means, or instructions for instructing the second cloud environment to generate the second computing resource may include operations, features, means, or instructions for instructing the second cloud environment to generate the second computing resource based on one or more parameters associated with the first computing resource stored in the first cloud environment.

In some examples of the method, apparatuses, and non-transitory computer-readable medium described herein, the second compute job may be further operable to cause the second cloud environment to convert the data transferred to the second cloud environment from a second format to a third format that may be compatible with the second computing resource before loading the data into the second computing resource generated in the second cloud environment.

Some examples of the method, apparatuses, and non-transitory computer-readable medium described herein may further include operations, features, means, or instructions for receiving, at the data management system, one or more grants of permission for the data management system to access the first cloud environment and the second cloud environment, where generating the first compute job and generating the second compute job may be based on the one or more grants of permission.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

receiving, at a data management system configured to interface with a first cloud environment and a second cloud environment, a request to migrate a first computing resource stored in the first cloud environment to the second cloud environment;

generating, by the data management system, a job in the first cloud environment to acquire one or more backups of the first computing resource;

generating, by the data management system based at least in part on receiving the request, a first compute job in the first cloud environment, wherein the first compute job is operable to cause the first cloud environment to extract data from a backup from among the one or more backups of the first computing resource in the first cloud environment and transfer the data to the second cloud environment, and wherein extracting the data from the backup is based at least in part on the backup being acquired within a threshold time period of a first time at which the request is received;

instructing, by the data management system based at least in part on receiving the request, the second cloud environment to generate a second computing resource in the second cloud environment; and generating, by the data management system after generating the second computing resource in the second cloud environment, a second compute job in the second cloud environment, wherein the second compute job is operable to cause the second cloud environment to load the data extracted from the backup of the first computing resource in the first cloud environment into the second computing resource generated in the second cloud environment.

2. The method of claim 1, wherein the job comprises a background job that is operable to cause the first cloud environment to:

generate a snapshot of the first computing resource stored in the first cloud environment at a first point in time; and store the snapshot of the first computing resource at the first cloud environment, wherein the snapshot of the first computing resource stored at the first cloud environment comprises the backup of the first computing resource.

3. The method of claim 2, wherein generating the background job further comprises:
generating the background job to acquire the backup of the first computing resource in response to receiving the request to migrate the first computing resource stored in the first cloud environment to the second cloud environment.

4. The method of claim 2, wherein generating the background job further comprises:
generating the background job periodically or semi-statically.

5. The method of claim 1, wherein:
the backup comprises one or more incremental snapshots of the first computing resource; and
the first compute job is further operable to cause the first cloud environment to process the one or more incremental snapshots of the backup to obtain a full backup of the first computing resource, the full backup having a first format supported by the first cloud environment, wherein extracting the data from the backup comprises extracting the data from the full backup of the first computing resource.

6. The method of claim 1, wherein:
the first compute job is further operable to cause the first cloud environment to generate, after extracting the data from the backup of the first computing resource, a second backup of the first computing resource, the second backup comprising the data and having a second format that is supported by the second cloud environment, wherein transferring the data from the first cloud environment to the second cloud environment as part of the first compute job comprises transferring the second backup of the first computing resource corresponding to the second format.

7. The method of claim 1, wherein instructing the second cloud environment to generate the second computing resource comprises:
instructing, after the first compute job is executed, the second cloud environment to generate the second computing resource based at least in part on configuration information received by the data management system, the configuration information indicating one or more parameters associated with the second computing resource.

8. The method of claim 1, wherein instructing the second cloud environment to generate the second computing resource comprises:
instructing the second cloud environment to generate the second computing resource based at least in part on one or more parameters associated with the first computing resource stored in the first cloud environment.

9. The method of claim 1, wherein the second compute job is operable to cause the second cloud environment to convert the data transferred to the second cloud environment from a second format to a third format that is compatible with the second computing resource before loading the data into the second computing resource generated in the second cloud environment.

10. The method of claim 1, further comprising:
receiving, at the data management system, one or more grants of permission for the data management system to access the first cloud environment and the second cloud environment, wherein generating the first compute job and generating the second compute job is based at least in part on the one or more grants of permission.

11. An apparatus, comprising:
a processor;
memory coupled with the processor; and
instructions stored in the memory and executable by the processor to cause the apparatus to:
receive, at a data management system configured to interface with a first cloud environment and a second cloud environment, a request to migrate a first computing resource stored in the first cloud environment to the second cloud environment;
generate, by the data management system, a job in the first cloud environment to acquire one or more backups of the first computing resource;
generate, by the data management system based at least in part on receiving the request, a first compute job in the first cloud environment, wherein the first compute job is operable to cause the first cloud environment to extract data from a backup from among the one or more backups of the first computing resource in the first cloud environment and transfer the data to the second cloud environment, and wherein extracting the data from the backup is based at least in part on the backup being acquired within a threshold time period of a first time at which the request is received:
instruct, by the data management system based at least in part on receiving the request, the second cloud environment to generate a second computing resource in the second cloud environment; and
generate, by the data management system after generating the second computing resource in the second cloud environment, a second compute job in the second cloud environment, wherein the second compute job is operable to cause the second cloud environment to load the data extracted from the backup of the first computing resource in the first cloud environment into the second computing resource generated in the second cloud environment.

12. The apparatus of claim 11, wherein
wherein the job comprises a background job that is operable to cause the first cloud environment to:
generate a snapshot of the first computing resource stored in the first cloud environment at a first point in time; and
store the snapshot of the first computing resource at the first cloud environment, wherein the snapshot of the first computing resource stored at the first cloud environment comprises the backup of the first computing resource.

13. The apparatus of claim 12, wherein, to generate the background job, the instructions are executable by the processor to cause the apparatus to:
generate the background job to acquire the backup of the first computing resource in response to receiving the request to migrate the first computing resource stored in the first cloud environment to the second cloud environment.

14. The apparatus of claim 12, wherein, to generate the background job, the instructions are executable by the processor to cause the apparatus to:
generate the background job periodically or semi-statically.

15. The apparatus of claim 11, wherein:
the backup comprises one or more incremental snapshots of the first computing resource; and the first compute job is further operable to cause the first cloud environment to process the one or more incremental snapshots of the backup to obtain a full backup of the first computing resource, the full backup having a first format supported by the first cloud environment, wherein extracting the data from the backup comprises extracting the data from the full backup of the first computing resource.

16. The apparatus of claim 11, wherein:
the first compute job is further operable to cause the first cloud environment to generate, after extracting the data from the backup of the first computing resource, a second backup of the first computing resource, the second backup comprising the data and having a second format that is supported by the second cloud environment, wherein transferring the data from the first cloud environment to the second cloud environment as part of the first compute job comprises transferring the second backup of the first computing resource corresponding to the second format.

17. A non-transitory computer-readable medium storing code, the code comprising instructions executable by a processor to:
receive, at a data management system configured to interface with a first cloud environment and a second cloud environment, a request to migrate a first computing resource stored in the first cloud environment to the second cloud environment;
generate, by the data management system, a job in the first cloud environment to acquire one or more backups of the first computing resource;
generate, by the data management system based at least in part on receiving the request, a first compute job in the first cloud environment, wherein the first compute job is operable to cause the first cloud environment to extract data from a backup from among the one or more backups of the first computing resource in the first cloud environment and transfer the data to the second cloud environment, and wherein extracting the data from the backup is based at least in part on the backup being acquired within a threshold time period of a first time at which the request is received;
instruct, by the data management system based at least in part on receiving the request, the second cloud environment to generate a second computing resource in the second cloud environment; and
generate, by the data management system after generating the second computing resource in the second cloud environment, a second compute job in the second cloud environment, wherein the second compute job is operable to cause the second cloud environment to load the data extracted from the backup of the first computing resource in the first cloud environment into the second computing resource generated in the second cloud environment.

18. The non-transitory computer-readable medium of claim 17,
wherein the job comprises a background job that is operable to cause the first cloud environment to:
generate a snapshot of the first computing resource stored in the first cloud environment at a first point in time; and
store the snapshot of the first computing resource at the first cloud environment, wherein the snapshot of the first computing resource stored at the first cloud environment comprises the backup of the first computing resource.

19. The non-transitory computer-readable medium of claim 18, wherein, to generate the background job, the instructions are executable by the processor to:
generate the background job to acquire the backup of the first computing resource in response to receiving the request to migrate the first computing resource stored in the first cloud environment to the second cloud environment.

20. The non-transitory computer-readable medium of claim 18, wherein, to generate the background job, the instructions are executable by the processor to:
generate the background job periodically or semi-statically.

* * * * *